United States Patent
Sanchez Aguilar et al.

(10) Patent No.: US 11,550,532 B1
(45) Date of Patent: Jan. 10, 2023

(54) MODULAR DISPLAY ASSEMBLY FOR VEHICLES

(71) Applicant: Honda Motor Co., Ltd., Tokyo (JP)

(72) Inventors: Antonio E. Sanchez Aguilar, Birmingham, MI (US); Masatoshi Kubota, Sakura (JP); Tomoya Hagihara, Novi, MI (US)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 17/403,061

(22) Filed: Aug. 16, 2021

(51) Int. Cl.
*G06F 3/14* (2006.01)
*B60K 35/00* (2006.01)

(52) U.S. Cl.
CPC ............ *G06F 3/1446* (2013.01); *B60K 35/00* (2013.01); *B60K 2370/52* (2019.05); *B60K 2370/788* (2019.05)

(58) Field of Classification Search
CPC . G06F 3/1446; B60K 35/00; B60K 2370/788; B60K 2370/52
See application file for complete search history.

(56) References Cited

U.S. PATENT DOCUMENTS

| | | | | |
|---|---|---|---|---|
| 10,809,960 | B2* | 10/2020 | Einecke | G06F 3/1423 |
| 10,814,746 | B2* | 10/2020 | Sailer | B62D 63/04 |
| 2003/0151562 | A1* | 8/2003 | Kulas | G06F 3/1446 |
| | | | | 345/1.1 |
| 2005/0168399 | A1* | 8/2005 | Palmquist | G06F 1/1601 |
| | | | | 345/1.1 |
| 2011/0199319 | A1* | 8/2011 | Moser | G06F 1/1616 |
| | | | | 73/488 |
| 2011/0199726 | A1* | 8/2011 | Moser | G06F 1/1616 |
| | | | | 375/259 |
| 2013/0096820 | A1 | 4/2013 | Agnew | |
| 2013/0190977 | A1* | 7/2013 | Onaka | G06F 3/0484 |
| | | | | 701/36 |
| 2015/0032328 | A1* | 1/2015 | Healey | G06Q 30/0241 |
| | | | | 701/36 |
| 2019/0031102 | A1 | 1/2019 | Kishimoto | |
| 2019/0197927 | A1* | 6/2019 | Matsuoka | G09F 15/0056 |
| 2019/0315275 | A1 | 10/2019 | Kim et al. | |
| 2020/0225903 | A1* | 7/2020 | Cohen | G09G 5/12 |
| 2020/0233626 | A1* | 7/2020 | Fujii | G06F 3/1446 |
| 2022/0013045 | A1* | 1/2022 | Takeda | G06Q 30/0265 |

FOREIGN PATENT DOCUMENTS

| | | |
|---|---|---|
| CN | 101169911 A | 4/2008 |
| CN | 101786419 A | 7/2010 |
| CN | 105216695 B | 7/2018 |
| DE | 102006034954 A1 | 1/2008 |

(Continued)

*Primary Examiner* — Ariel A Balaoing
(74) *Attorney, Agent, or Firm* — Plumsea Law Group, LLC

(57) ABSTRACT

A modular display system for a vehicle is disclosed. The system includes a plurality of display units that may be arranged along an exterior of the vehicle in different orientations. The system offers a modular, scalable, accessible, and simplified approach to exterior displays for automated and other types of vehicles. The displays, being modular, are not tied to the specific mounting location on the vehicle's exterior. The image data for each display is rotated based on the orientation of the display as installed which is identified by reference to the distinct pin connections of each display's control port.

20 Claims, 9 Drawing Sheets

(56) References Cited

FOREIGN PATENT DOCUMENTS

| | | |
|---|---|---|
| DE | 102013225955 A1 | 6/2014 |
| JP | 2018169580 A | 11/2018 |
| JP | 2020191531 A | 11/2020 |
| JP | 2021002835 A | 1/2021 |
| JP | 6838499 B2 | 3/2021 |
| WO | 2018233883 A1 | 12/2018 |

\* cited by examiner

MODULAR DISPLAY ASSEMBLY FOR VEHICLES

BACKGROUND

The present disclosure generally relates to display systems, and more particularly, to an assembly of displays for presenting information along an exterior of a vehicle.

Display systems are commonly provided in vehicles today, such as in airplanes, buses, and minivans. For example, automotive vehicles may be equipped with various electronic entertainment and information systems, sometimes referred to as infotainment systems. Such displays can offer information and entertainment for passengers, including but not limited to mapping and navigation tools, web browsing, DVD or television playback, and video game systems. The displays are typically mounted on a dashboard of the vehicle or on a rear portion of a seat such as in the headrest or seat back. Such display arrangements are appropriate for conventional vehicles where the vehicle operator and/or passengers are seated in a forward-facing direction. In addition, displays may be mounted on an exterior surface of the vehicle in order to provide information about the vehicle, its capacity, its destination, etc. Such displays offer important guidance to potential passengers, particularly in cases where the vehicle is designed for shared occupancy.

There is a need in the art for a display system that accommodates non-traditional vehicle designs, in particularly with respect to autonomous vehicles.

SUMMARY

The disclosed embodiments provide methods and systems for an exterior display system in vehicles.

In one aspect, a modular display system for a vehicle is disclosed. The system includes a plurality of identical display units including a first display unit and a second display unit. In addition, the first display unit is mounted on a first portion of an exterior of the vehicle in a first orientation and the second display unit is mounted on a second portion of the exterior of the vehicle in a second orientation that differs from the first orientation by a first rotation increment. The system further includes a display control module configured to convey image data to the first display unit and the second display unit, where the image data provided to the second display unit is rotated by the first rotation increment.

Another aspect provides a method of displaying image data on an exterior of a vehicle. The method includes a first step of transmitting first image data to a first display mounted at a first orientation on a first portion of the exterior of the vehicle. In addition, the method includes a second step of presenting a first image on a screen for the first display based on the first image data. A third step includes transmitting the first image data to a second display mounted at a second orientation on a second portion of the exterior of the vehicle, the second orientation being rotated by a first increment relative to the first orientation. A fourth step includes automatically rotating the first image data by the first increment before presenting a second image on a screen for the second display, the second image being based on the rotated first image data.

Another aspect provides a vehicle incorporating a modular display system. The vehicle includes a first mounting assembly formed on a first portion of an exterior of the vehicle, as well as a second mounting assembly substantially similar to the first mounting assembly formed on a second portion of an exterior of the vehicle. The second mounting assembly and the first mounting assembly are arranged such that the two are substantially symmetrical to each other relative to a midline of the distance between them. The vehicle also includes a first display unit installed in the first mounting assembly in a first orientation, and a second display unit installed in the second mounting assembly in a second orientation that differs from the first orientation by a first rotation increment.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Figure 1:
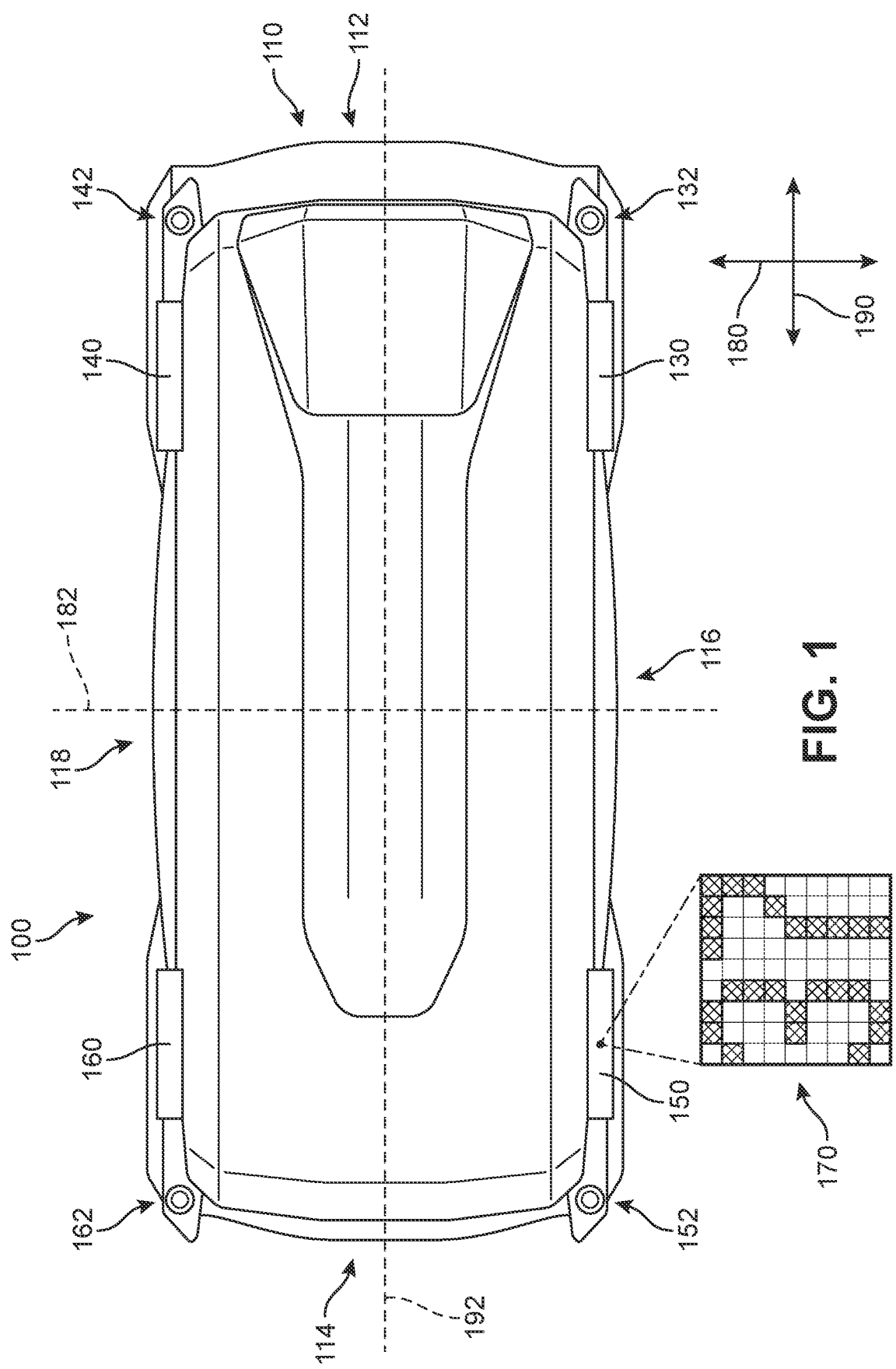
FIG. 1 presents a top-down view of a vehicle in which a modular display system is installed, according to an embodiment.

Vehicle automation technology can reduce or even eliminate human error, offers highly reliable and accurate performance, and decreases labor costs. However, the penetration of automated vehicle systems in the market has been impaired by the difficulty of developing a system that is sufficiently generic so as to be readily implemented across a wide range of vehicle configurations. There are currently few "off-the-shelf" solutions in autonomous vehicle (AV) exterior display systems. Rather, each system includes various components that are customized to the vehicle.

As will be discussed in detail below, the proposed systems offer a modular, scalable, accessible, and simplified approach to exterior displays for AVs and other types of vehicles. The displays, being modular, are not tied to the specific mounting location on the vehicle's exterior. More specifically, in some embodiments, a vehicle display system can be deployed by incorporating identical or otherwise common part-type displays that can be installed at different positions around the vehicle's exterior and at different orientations. The system can comprise two display units, while in other embodiments, the system can include three or more display units. In addition, in some embodiments, only a single display unit need be directly connected to the vehicle's electronic control unit (ECU) in order for all of the display units to collectively operate. Thus, in different embodiments, a display system may deploy a flexible and scalable number of display units that can be mass produced as common components.

Thus, particularly in the case of some shared autonomous vehicles (SAVs) that are driverless and used for ride-sharing, being outfitted with modular display components can significantly reduce the cost for both the manufacturer and, down the road, the passengers. Rather than having a first type of display component for one portion of the vehicle (e.g., the front right corner), requiring a first type of housing and mounting assembly, and a second, different type of display component for another portion of the vehicle (e.g., the front left corner), requiring a second type of housing and mounting assembly, a single type of display component can be incorporated into the vehicle. Such modular display units allow for lower costs in production, maintenance, repair, and replacement. As will be discussed in detail below, this modularity is possible in part because of the structural capacity of each of the display units to be installed on the vehicle in different orientations. In such cases, the display system can be configured to rotate image objects to accommodate various display unit orientations.

As a general matter, autonomous vehicles herein refer to unmanned devices which have a drive means or propulsion means in order to move the autonomous device ("self-propelled") and an onboard energy reservoir to power the propulsion mean. In some embodiments, the AV also includes one or more sensors and a control means functionally connected to the sensor(s) and the drive means. The AV navigates in a free manner that can occur without human support based on sensor data acquired by one or more sensor(s) and processed in the control means in order to generate control signals for the propulsion means. In other embodiments, the AV can receive remote command signals from a human operator or other centralized coordinator control module. Furthermore, a modular system generally refers to a system in which some or all components are interchangeable. This modularity is intended to make repairs and maintenance easier, and to allow the vehicle to be readily reconfigured to suit different functions.

For purposes of introduction, an overview of one embodiment of the proposed systems and methods is illustrated with reference to FIGS. 1-2B. In FIG. 1, a top-down view of a vehicle 110 in which a modular display system ("system") 100 has been installed is depicted. In one embodiment, the system 100 can include a plurality of identical display units, and a connection mechanism to the vehicle's electronic control unit (ECU). Furthermore, as will be discussed below, in some embodiments, the system 100 can include a display control module for generating image data for presentation on the display units.

In different embodiments, vehicles described herein can be understood to include a vehicle control system. The vehicle control system is realized by, for example, one or more processors or hardware having equivalent functions. The vehicle control system may have a configuration in which a processor such as a central processing unit (CPU), a data storage device, an electronic control unit (ECU) in which a communication interface is connected by an internal bus, a micro-processing unit (MPU), and the like are combined. In some embodiments, the vehicle control system can include components and modules configured to enable an AV to operate autonomously. As some non-limiting examples, the vehicle control system might include a target lane determination module, an automated driving control module, a travel control module, a human-machine interface (HMI) control module, a display control module, and/or a storage module. The automated driving control module could include, for example, an automated driving mode control module, a vehicle position recognition module, an external environment recognition module, an action plan generation module, a trajectory generation module, and/or a switching control module. Each module can be realized or implemented by the processor executing a program (software). Further, some or all of these may be realized by hardware such as a large-scale integration (LSI) or an application specific integrated circuit (ASIC) or may be realized by a combination of software and hardware. In some embodiments, information such as map information, target lane information, action planning information, and HMI control can be stored in the storage module. The program executed by the processor may be stored in the storage module in advance, or may be downloaded from an external device via a communications module.

For purposes of reference, the exterior of the vehicle 110 can be understood to include a forward end 112, a rear end 114, a first side 116, and a second side 118. In different embodiments, the system 100 includes a display assembly comprising a first display unit ("first display") 130, a second display unit ("second display") 140, a third display unit ("third display") 150, and a fourth display unit ("fourth display") 160. In other embodiments, there may be fewer or a greater number of display units installed around the exterior of the vehicle 110. As shown in FIG. 1, in some embodiments, the display units can be installed at various positions around the vehicle 110. For example, in one embodiment, the first display 130 is installed on a first forward portion, the second display 140 is installed on a second forward portion, the third display 150 is installed on a first rear portion, and the fourth display 160 is installed on a second rear portion.

For clarity, the description makes reference to a set of axes. As a general matter, the term "longitudinal axis" as used throughout this detailed description and in the claims refers to an axis that extends in a longitudinal direction, which is a direction extending the length of each component. In the present case, the distance between first display 130 and third display 150 is aligned with a longitudinal axis 190. Similarly, the term "lateral axis" as used throughout this detailed description and in the claims refers to an axis that extends in a lateral direction, which is a direction running a width of each component. In the present case, the distance between first display 130 and second display 140 is aligned with a lateral axis 180. In addition, the term "vertical axis" as used throughout this detailed description and in the claims refers to an axis that extends in a vertical direction, which is a direction running from the roof structure to the floor of a vehicle (see FIGS. 2A and 2B). Each axis of the three axes may be understood to be orthogonal relative to the other two axes.

Furthermore, the description makes reference to distal and proximal directions (or portions). As used herein, the distal direction is a direction outward or oriented away from a center of the vehicle 110. Also, the proximal direction is a direction oriented toward a center of the vehicle 110. Thus, a distal side or region refers to a portion of a component that is disposed further from the center and a proximal side or region refers to a portion of a component that is disposed nearer to the center.

In the embodiment depicted in FIG. 1, the arrangement of displays on first side 116 and the arrangement of displays on second side 118 may be understood to provide substantially symmetrical display arrangements relative to a longitudinal midline 192, as well as relative to a lateral midline 182. In other words, first display 130 and second display 140 are substantially aligned with respect to a lateral axis 180, third display 150 and fourth display 160 are substantially aligned with respect to the lateral axis 180. In addition, first display 130 and third display 150 are substantially aligned with respect to a longitudinal axis 190, and second display 140 and fourth display 160 are substantially aligned with respect to the longitudinal axis 190. However, in other embodiments, displays may be mounted at alternate or additional positions.

More specifically, it can be observed that first display 130 is disposed along the first side 116 adjacent to and rearward of a first forward pillar 132, and the second display 140 is disposed along the second side 118 adjacent to and rearward of a second forward pillar 142. In addition, the third display 150 is disposed along the first side 116 adjacent to and forward of a first rearward pillar 152, and the fourth display 160 is disposed along the second side 118 adjacent to and forward of a second rearward pillar 162.

As a general matter, a pillar can refer to a vertical or near vertical support structure located in and/or providing the corner regions of the vehicle's structure. While traditional vehicles include A, B, C (and so forth) pillars based on, for example, their location relative to the vehicle's front windshield, the front doors and rear doors, or behind the rear doors. In contrast, a shared autonomous vehicle (SAV), or an autonomous vehicle (AV) can include less conventional seating arrangements. As a result, autonomous vehicles may not require components or structures that a non-AV would (e.g., B-pillars in between the front row and second row, a steering wheel, etc.). Moreover, the passenger who is normally seated in the driver's seat may no longer need to be facing forwards towards the front windshield. This is because the occupant seated in the driver's seat no longer needs to view the roadways. As a result, autonomous vehicles can be equipped with flexible seating configurations that allow for the front passengers to rotate their seats into a rearward facing orientation or a side-facing orientation that may be referred to as a campfire style (or a carriage style) seating arrangement of the vehicle.

As a result, some AVs may include only four pillars at the four outermost corner portions of the vehicle. In other examples, an AV may not include pillars in the conventional sense, as there is no driver and/or forward extending engine compartment, and no requirement for forward facing passengers that typically divide the front row from the back row. For example, in one embodiment, the two pillars in the rear of the vehicle may simply be a large panel or frame extending from the first side to the second side. In other embodiments, the vehicle may have no pillars and instead include a chassis structure that provides a framework for the vehicle. In such cases, the display units can be understood to be in proximity to the corner regions of the vehicle, or spaced apart from the corner portions where a side of the vehicle and rear of the vehicle meet.

In different embodiments, each display can be configured to present various information represented as image data. In FIG. 1, an example of a displayed image object 170 (in this case, the number "37") is depicted on the third display 150. In some embodiments, the displays include monitors or screens for the presentation of various visual data. In some embodiments, the screens may be configured to present high density images, while in other embodiments, they may be configured as low-density color screens (e.g., LCD screens). One example of a display type that may be used will be described below with reference to FIGS. 3A and 3B.

Figure 2A:
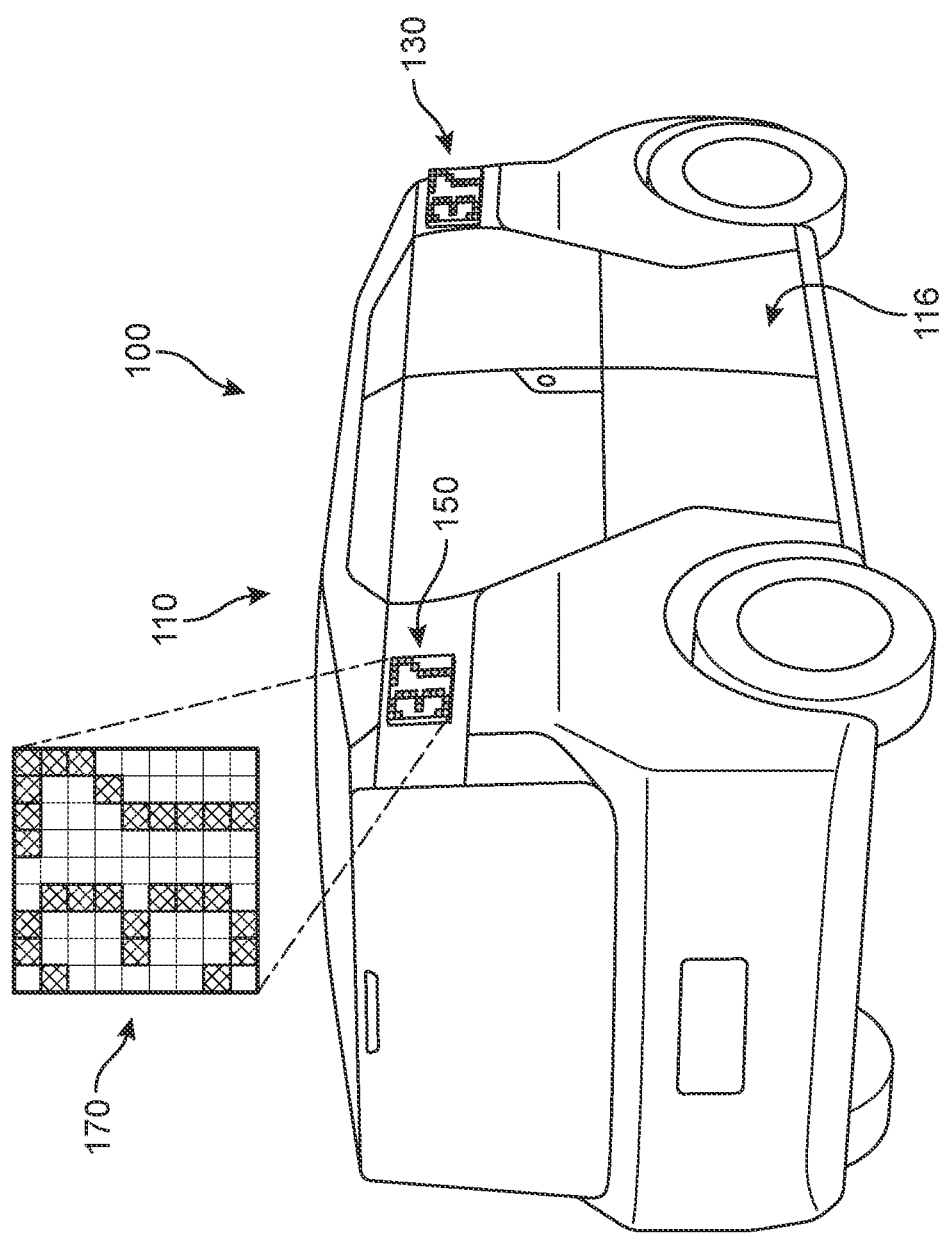
FIGS. 2A and 2B are perspective side views of the vehicle of FIG. 1, according to an embodiment.
Figure 2B:
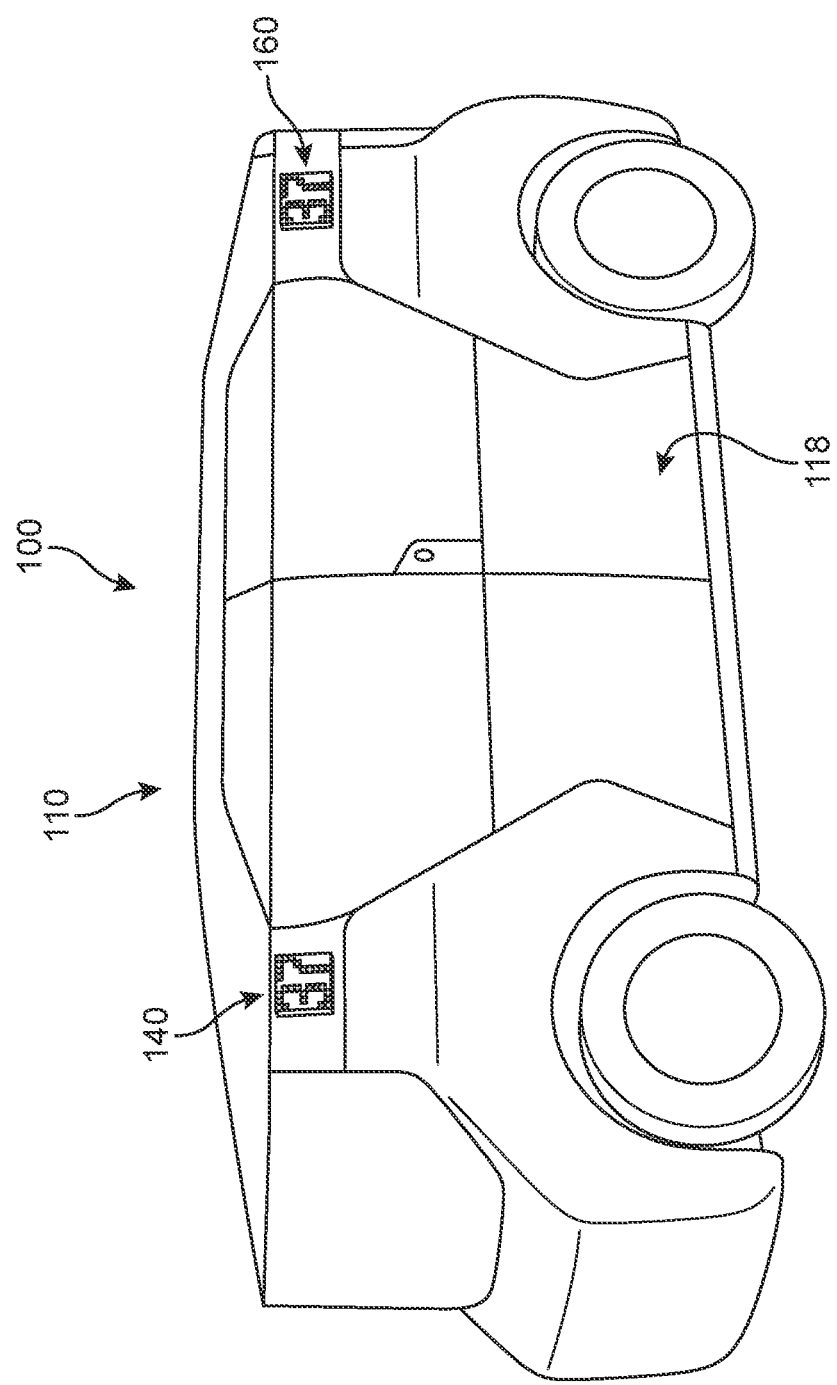

For purposes of clarity, FIGS. 2A and 2B provide two views of the vehicle 100 in which an embodiment of the display system 100 has been installed. In FIG. 2A, a rear perspective view is illustrated that more clearly shows the positions of first display 130 and the third display 150 installed on the first side 116 of vehicle 110. Similarly, FIG. 2B offers a forward perspective view illustrating the second display 140 and the fourth display 160 installed on the second side 118 of vehicle 110. With this arrangement, it may be appreciated that potential passengers approaching vehicle from either side or end may easily identify the vehicle by indicia or other information presented on the displays.

Figure 3A:
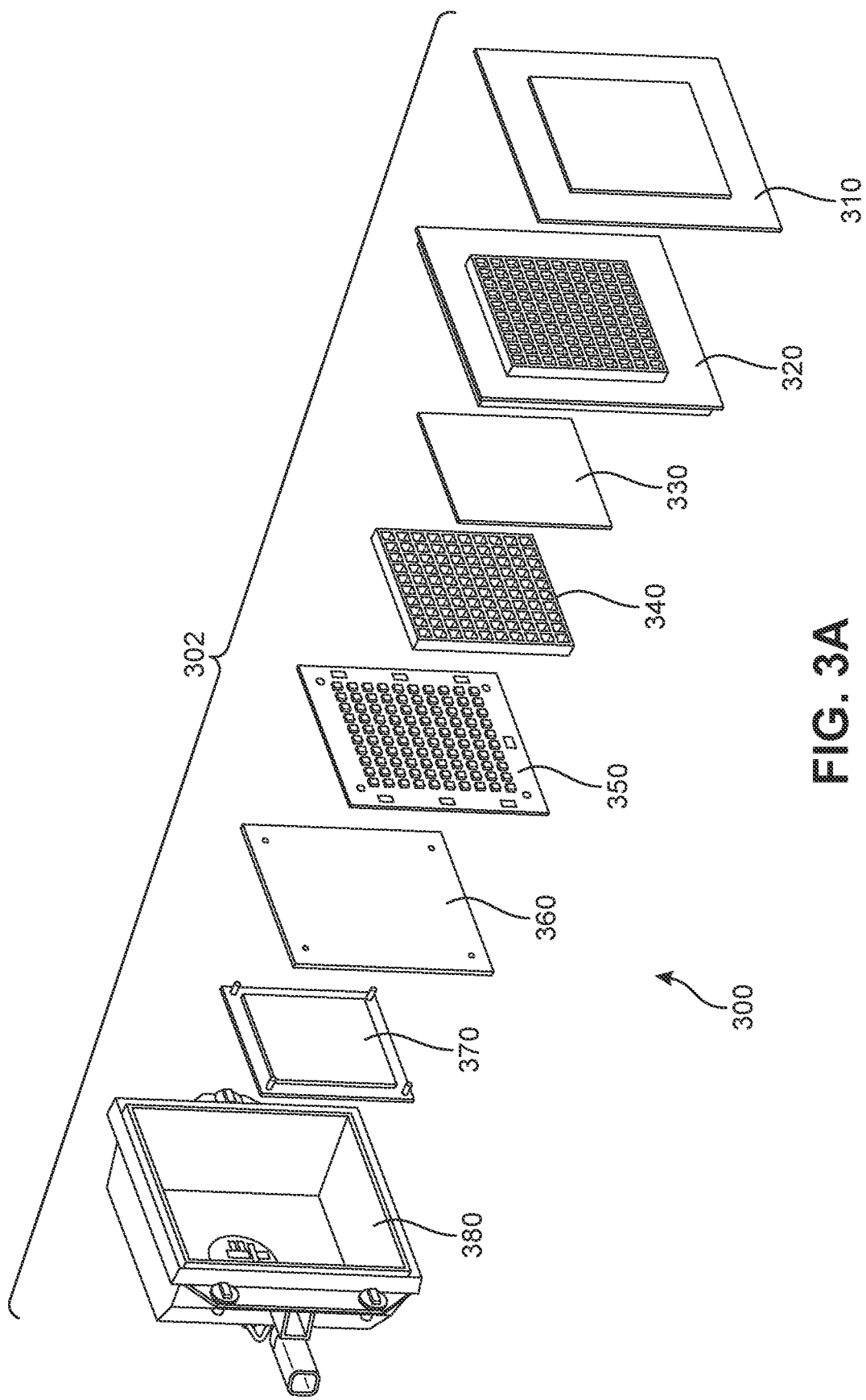
FIGS. 3A and 3B are schematic exploded views of an example modular display unit, according to an embodiment.
Figure 3B:
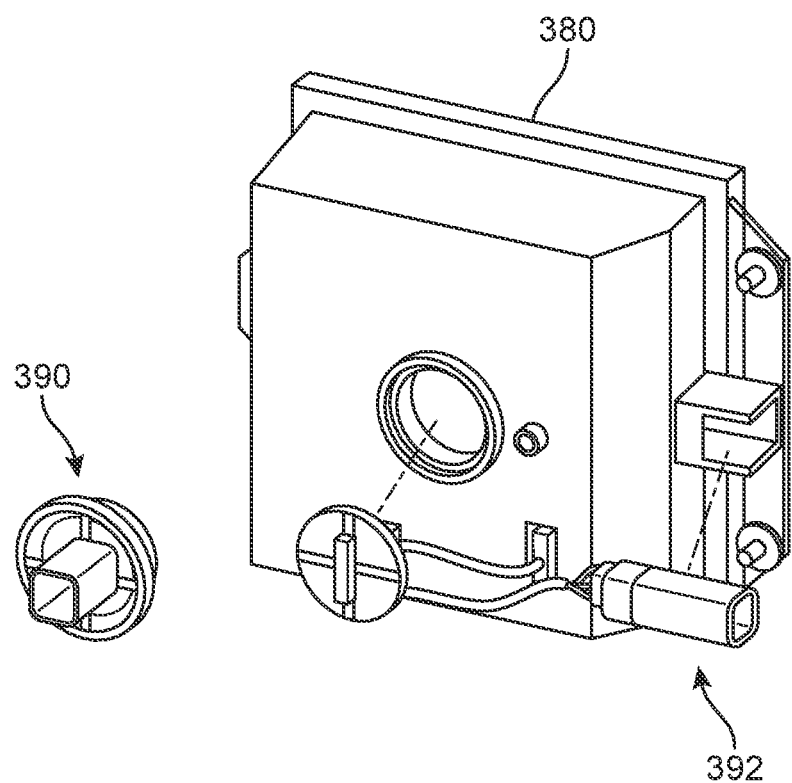

As noted earlier, various types of displays may be used by the proposed embodiments. As one non-limiting example, a modular display unit 300 is shown in FIG. 3A with an exploded view of the multiple layers comprising a modular display package 302. In this example, modular display unit 300 includes an outer lens 310 disposed forward of an optional outer bezel 320. The unit further includes an inner diffuser lens 330 disposed between the outer lens 310 and an inner bezel 340. Behind the outer bezel 340 is a PCB layer 350 which is disposed against a heat sink material layer 360. Finally, a light-emitting layer such as an LED display or other light source. These elements together are secured in a housing 380 that includes connector mechanisms 390 such as potted or pigtail connectors, or any other suitable connectors known by those skilled in the art. It can be observed in the rear perspective view of FIG. 3B that a connector component 392 extends outward from one side of the housing in a direction aligned with a midline of the housing 380 (e.g., see connector elements in FIG. 4), in this case from a central portion 394 of the housing 380.

In other embodiments, one or more layers may be omitted or replaced by other types of layers and/or additional layers may be included. It is to be understood that in some embodiments, the display unit 300 and/or the modular display package 302 are configured to be rotated as a whole, or to be rotated relative to one another, prior to installation on the vehicle.

Figure 4:
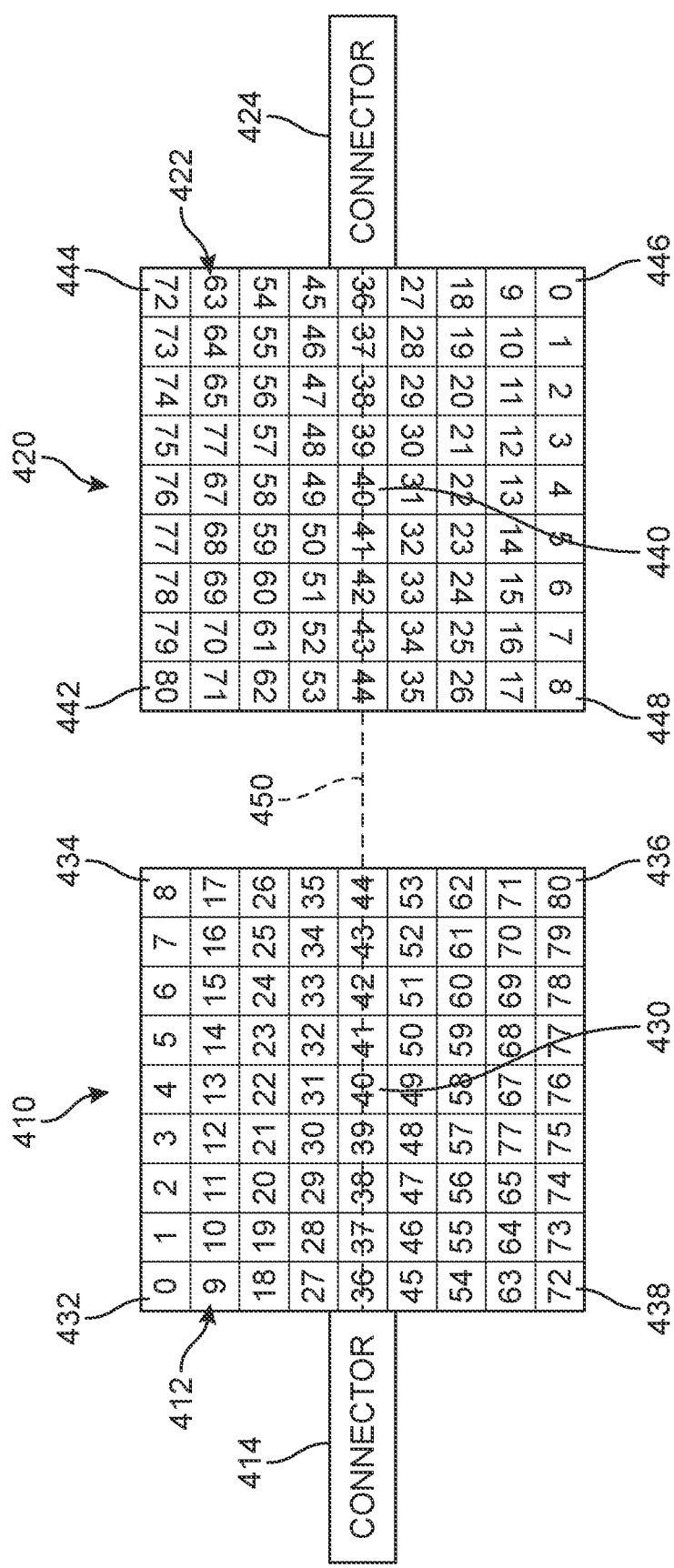
FIG. 4 is a schematic of two pixel arrays for the screens of two of the display units, according to an embodiment.

As noted earlier, in different embodiments, the displays can be oriented to ensure a modular functionality across the vehicle's exterior. In other words, regardless of where the display unit is mounted, it may be rotated in order to properly fit within the standard housing for said display formed along the exterior of the vehicle, as well as the connector elements disposed near the housing. In FIG. 4, an example of this type of rotation is shown by a schematic representation of two display unit screens, each as a matrix of 9×9 pixels. It should be understood that the 9×9 matrix is shown for purposes of illustration only, and other embodiments can include screens of larger size or smaller sizes, and/or a denser or less dense array of pixels. In particular, the array can be of any size that is a substantially regular shape (e.g., rectangle, circle, triangle) and lends itself to a consistent layout when rotated a particular amount. In FIG. 4, a square grid is illustrated that can be rotated 180 degrees. For purposes of this application, the degree to which a display and/or image data is rotated will be referred to as the rotation increment. In other embodiments, a rectangular grid may be rotated by a rotation increment of 180 degrees, or a square grid may be rotated 90 degrees. In some other examples, a triangular grid may be rotated 60 degrees or 120 degrees. Other examples may include further varying regular shapes (e.g., pentagon, hexagon, etc.).

In the embodiment of FIG. 4, a first array 410 corresponding to a screen for the second and fourth displays and a second array 420 corresponding to a screen for the first and third displays are shown. The first array 410 includes a first set 412 of 81 pixels. and the second array 420 includes a second set 422 of 81 pixels. In addition, along a first side coinciding with the first row of elements (0 to 72), a connector is shown, aligned with a first axis 450 that extends through a midline of the array (in this case, centered at element 36). In other words, the two screens are substantially identical.

However, the arrangement of the pixels in each set differ. More specifically, first array 410 is "right-side up" while the second array 420 has been rotated to be "upside down". In other words, the first array 410 is in a first orientation, and the second array 420 is in a second orientation, each being 180 degrees rotated relative to the other. Thus, the two top corner pixels (first pixel 432, second pixel 434) for first array 410 and the two top pixels (third pixel 442 and fourth pixel 444) for second array 420 differ. First array 410 has "0" in the top left (first pixel 432) and an "8" in the top right (second pixel 434), while second array 420 has an upside down "80" in the top left (third pixel 442) and an upside down "72" in the top right (fourth pixel 444). In addition, the two bottom corner pixels (fifth pixel 436, sixth pixel 438) for first array 410 and the two bottom pixels (seventh pixel 446 and eighth pixel 448) for second array 420 differ. First array 410 has "72" in the bottom left (fifth pixel 436) and an "80" in the bottom right (sixth pixel 438), while second array 420 has an upside down "8" in the bottom left (seventh pixel 446) and an upside down "0" in the bottom right (eighth pixel 448). In other words, the pixels have been rotated 180 degrees about a central point, in this case pixel 40. However, a first connector element 414 and a second connector element 424 remain aligned along a midline 450 of the display unit, thereby allowing the receiving connection on the vehicle to be substantially similar for the two displays.

Figure 5:
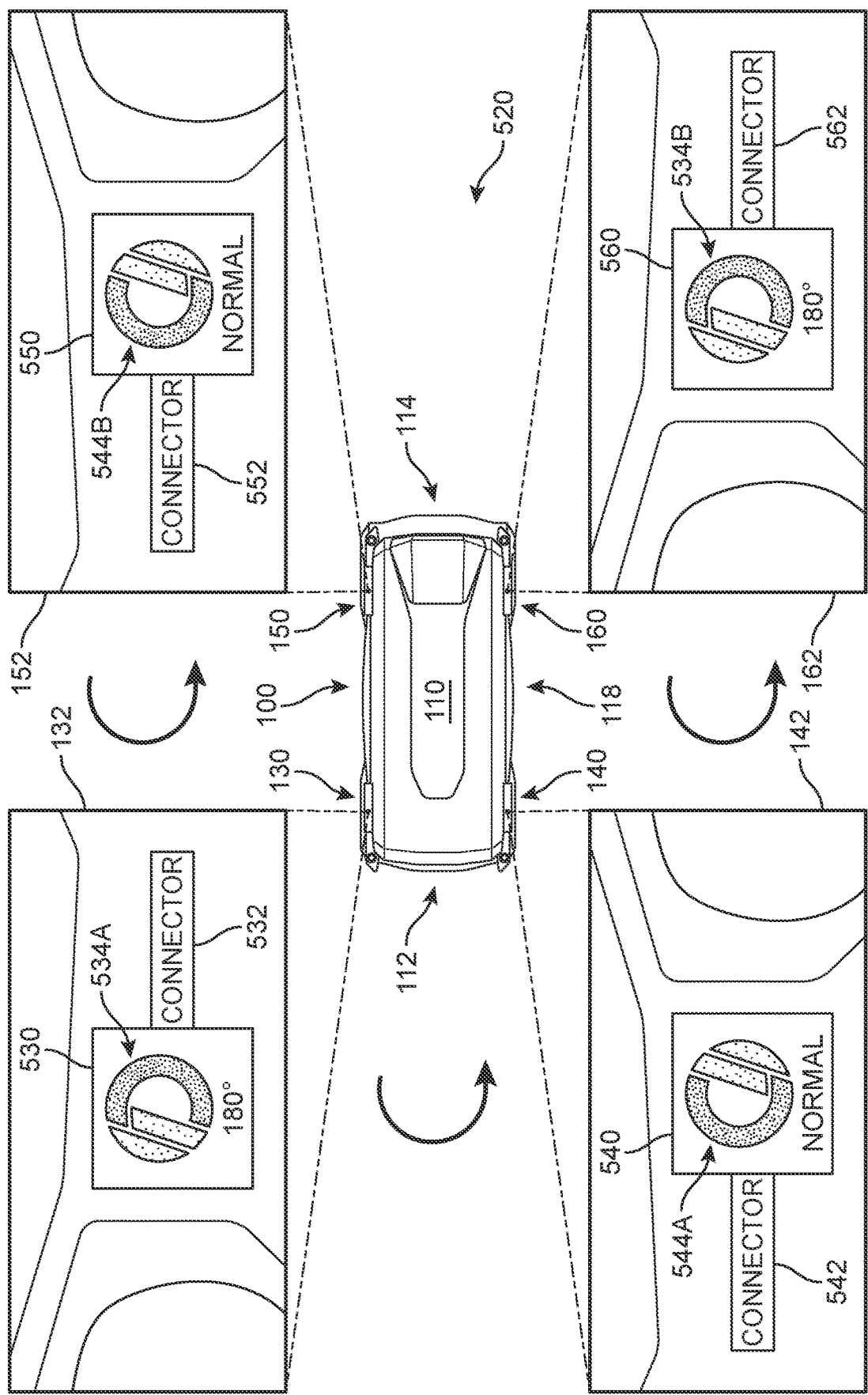
FIG. 5 is a schematic view of four displays installed in the vehicle and the image data being generated for each based on the orientation of the display screen, according to an embodiment.

An example illustrating this type of arrangement is presented in FIG. 5, where the displays are installed in vehicle 110. In this schematic, the first display 130 includes a first screen 530, the second display 140 includes a second screen 540, the third display 150 includes a third screen 550, and the fourth display 160 includes a fourth screen 560. In this particular example, it may be understood that the second screen 540 and third screen 550 are in the first orientation (e.g., first array 410 of FIG. 4), while the first screen 530 and fourth screen 560 (e.g., second array 420 of FIG. 4) are in the second, different orientation.

In order to provide clarity, the screens are shown adjacent to their respective pillars. It can thereby be observed that a first connector component 532 for first screen 530 is directed toward and proximate to the first forward pillar 132, a second connector component 542 for second screen 540 is directed toward and proximate to the second forward pillar 142, a third connector component 552 for third screen 550 is directed toward and proximate to the first rearward pillar 152, and a fourth connector component 562 for the fourth screen 560 is directed toward and proximate to the second rearward pillar 162. Thus, the connectors for first and third displays extend distally outward, and the connectors for second and fourth connectors also extend distally outward. In other words, the connectors for first display 130 and second display 140 extend in the same direction, and the connectors for third display 150 and fourth display 160 extend in the same direction. Such an arrangement allows a single display unit model to be configured for installation across each of the four positions on the vehicle 100 simply by a rotation of the display unit during installation.

Furthermore, the system 100 is configured to generate image data that will correspond to the orientation of the display on which it is to be presented. Thus, as shown in FIG. 5, an image object is automatically rotated 180 degrees when the data is being sent to the either or both of the first screen 530 and fourth screen 560 (i.e., the image is rotated and the system generates this reoriented image data 534a and 534b for presentation on the first screen 530 or fourth screen 560). In contrast, the image object remains in its original or 'normal' orientation and this normal image data (544a and 544b) is generated for presentation on either or both of the second screen 540 or third screen 550. The process of automatic image rotation by the display control module corresponding to the same rotation increment as the screens enables each display, regardless of orientation, to display identical image objects.

Figure 6:
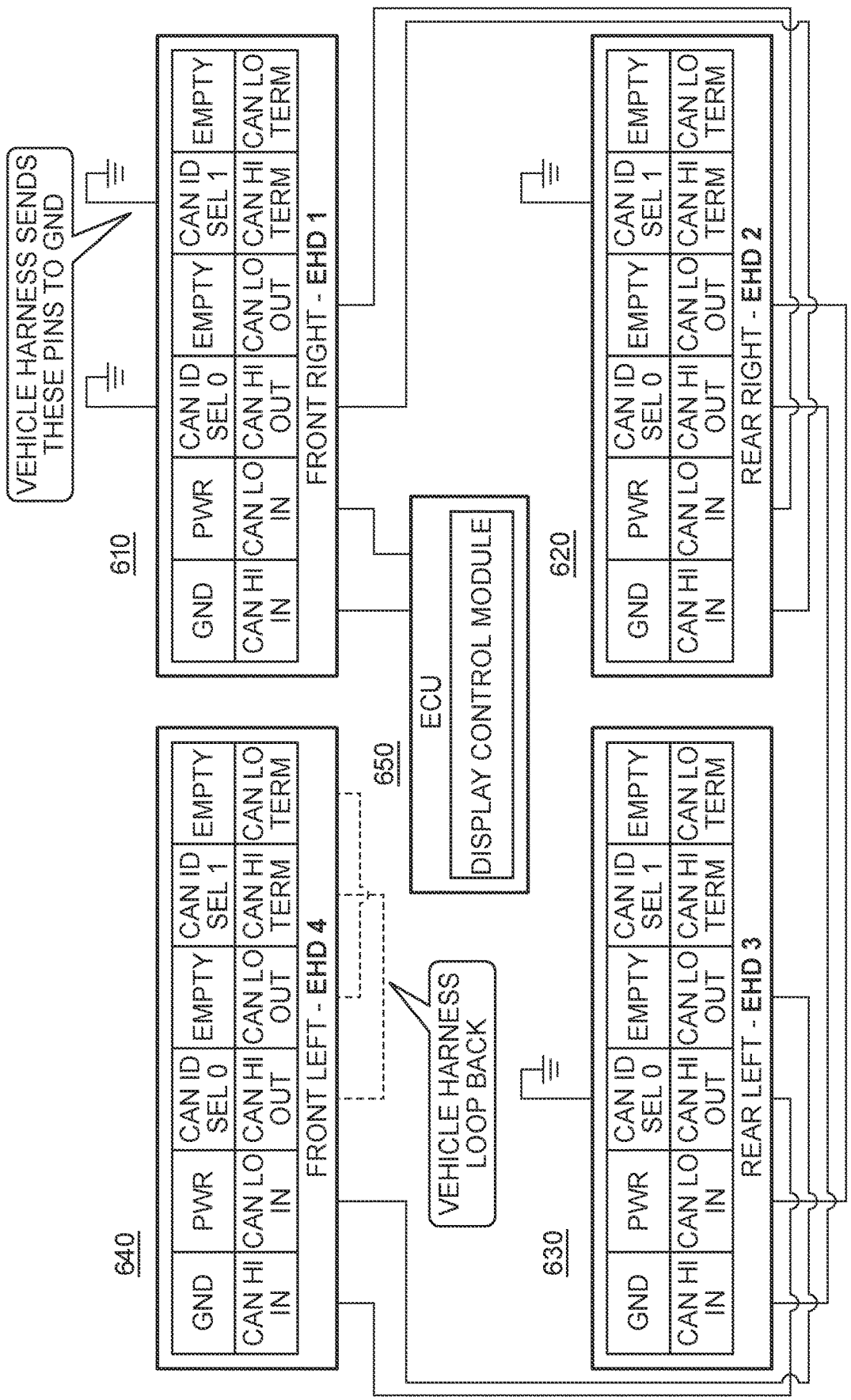
FIG. 6 is a schematic CAN diagram of the digital wiring for the modular display system, according to an embodiment.

For purposes of reference, FIG. 6 depicts one possible embodiment of a simplified Controller Area Network (CAN) specification schematic representing the digital data network and connection ports that may be available in the vehicle for receiving the four display units. For purposes of this example, each of four control ports include two rows of six pins, providing a total of 12 pins. The first or upper row includes a first set of pin types in a specific order: GND-PWR-CAN ID SEL 0-EMPTY-CAN ID SEL 1-EMPTY. The second or lower row includes a second set of pin types in a specific order: CAN HI IN-CAN LO IN-CAN HI OUT-CAN LO OUT-CAN HI TERM-CAN LO TERM. Thus, it may be understood that each pin type is different relative to the remaining 11 pin types provided by each control port.

Furthermore, it can be seen that only one control port, positioned to connect to the front right display (first display 130) is directly connected to an electronic control unit (ECU) 650 of the vehicle. The display control module of ECU 650 is configured to recognize connections associated with each of the pin types in the two rows across all four control ports. Thus, the control module can obtain the image data and then reorient the image data based on the connection pattern (e.g., based on the CAN ID—GND relationship) for each of the four control ports, thereby presenting the image in the proper orientation. In this specific example, the connection pattern between the two types of CAN ID pins and ground differ in each control port. This variation can be used to indicate the orientation and/or specific position (on the vehicle) of the display unit.

In this non-limiting example, a first connection pattern for a first control port 610 comprises a CAN ID SEL 0 (e.g., a first pin type) and CAN ID SEL 1 (e.g., a second pin type) being both linked to GND, a second connection pattern for a second control port 620 comprises a CAN ID SEL 1 (and not CAN ID SEL 0) being linked to GND, a third connection pattern for a third control port 630 comprises a CAN ID SEL 0 (and not CAN ID SEL 1) being linked to GND, and a fourth connection pattern for a fourth control port 640 comprises no link between either of the two CAN ID pins and GND. In other embodiments, the various connection patterns may be reorganized. For example, the first connection pattern could be implemented by the second control port, while the second connection pattern is implemented by one of the other three control ports.

As depicted FIG. 6, the arrangement of the connections is configured to enable each unit's control port to recognize the position of the display based on the CAN ID SEL 0/1 ground connection difference. In other words, by providing a 'fingerprint' connection pattern to ground for each control port, the system can be configured to identify the specific orientation of the associated display unit. In this example, both CAN ID SEL 0 and CAN ID SEL 1 of first control port 610 are connected to ground. This is an indication to the display control module associated with ECU 650 that the display unit on the front right of the vehicle is in a first orientation. Similarly, only CAN ID SEL 1 of second control port 620 is connected to ground. This is an indication to the display control module that the display unit on the rear right of the vehicle is in a second orientation that differs from the first orientation. In addition, only CAN ID SEL 0 of third control port 630 is connected to ground. This is an indication to the display control module that the display unit on the rear left of the vehicle is in a third orientation that differs from both the first orientation and the second orientation. Finally, both CAN ID SEL 0 and CAN ID SEL 1 of fourth control port 640 are not connected to ground. This is an indication to the display control module that the display unit on the front left of the vehicle is in a fourth orientation that differs from the first orientation, second orientation, and third orientation. Each of these four orientation modes based on the pin connections can thus be readily distinguished by the system, and the display control module can then be configured to output one, two, three, or four different image orientations based on the identified orientation mode. Rotation of the display unit is thereby accommodated without altering the image content, and instead automatically modifying the image's orientation based on the connection patterns.

Figure 7:
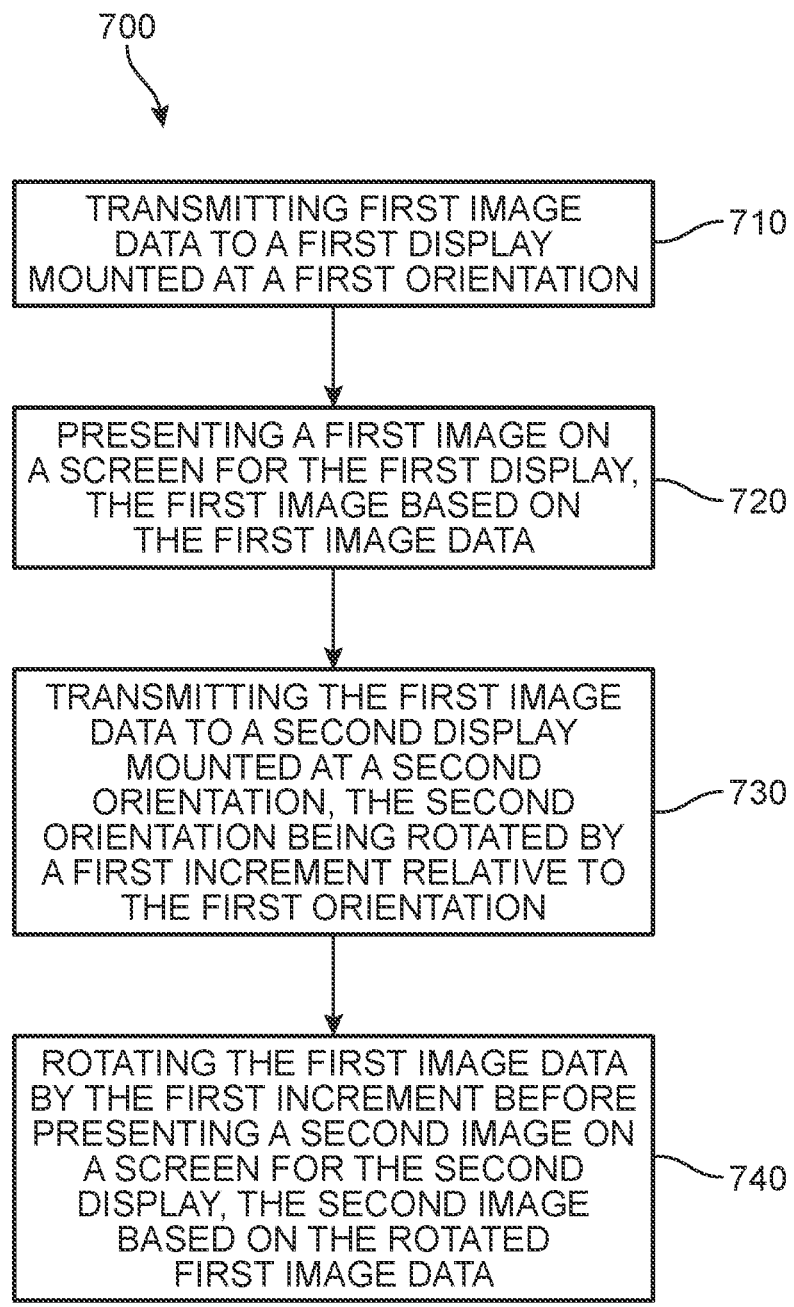
FIG. 7 is a flow diagram of a process of presenting an image object, according to an embodiment.

FIG. 7 is a flow chart illustrating an embodiment of a method 700 of displaying image data on an exterior of a vehicle. The method 700 includes a first step 710 of transmitting first image data to a first display mounted at a first orientation on a first portion of the exterior of the vehicle. In addition, the method 700 includes a second step 720 of presenting a first image on a screen for the first display based on the first image data. A third step 730 includes transmitting the first image data to a second display mounted at a second orientation on a second portion of the exterior of the vehicle, the second orientation being rotated by a first increment relative to the first orientation. A fourth step 740 includes automatically rotating the first image data by the first increment before presenting a second image on a screen for the second display, the second image based on the rotated first image data.

In other embodiments, the method may include additional steps or aspects. As one example, the first increment can be approximately 180 degrees or 90 degrees. In another example, the first image data is automatically rotated in response to detection of a first connection pattern for the second display unit that is different than a second connection pattern for the first display unit. In some embodiments, the first image and the second image appear identical when viewed by persons outside of the vehicle. In another embodiment, the method can further include steps of connecting the first display to an electronic control unit of the vehicle, and connecting the second display to the first display. In some embodiments, the first connection pattern includes one or more ground connections and the second connection pattern has no ground connections. In another embodiment, the first connection pattern includes a first pin of a first type connected to ground and a second pin of a second type connected to ground, and the second connection pattern includes a third pin of the first type As another example, the proposed embodiments can include a modular display system for a vehicle. The system includes a plurality of identical display units including a first display unit and a second display unit. In addition, the first display unit is configured to be or is mounted on a first portion of an exterior of the vehicle in a first orientation and the second display unit is configured to be or is mounted on a second portion of the exterior of the vehicle in a second orientation that differs from the first orientation by a first rotation increment. The system further includes a display control module configured to convey image data to the first display unit and the second display unit, where the image data provided to the second display unit is rotated by the first rotation increment.

In some embodiments, the system also includes additional features. In one example, the first portion is adjacent to a forward pillar of the vehicle and the second portion is adjacent to a rear pillar of the vehicle. In another example, the first portion is disposed along a first side of the vehicle and the second portion is disposed along a second, opposing side of the vehicle. In some embodiments, the first portion is adjacent to a first forward pillar of the vehicle proximate to the first side and the second portion is adjacent to a second forward pillar of the vehicle proximate to the second side. In another example, the plurality of identical display units further includes a third display unit and a fourth display unit, and the third display unit is configured to be or is mounted on a third portion of the exterior of the vehicle in the first orientation, and the second display unit is configured to be or is mounted on a fourth portion of the exterior of the vehicle in the second orientation.

In some embodiments, the display control module is further configured to convey image data to the third display unit and the fourth display unit, where the image data provided to the third display unit is rotated by the first rotation increment. In one embodiment, each display unit further includes a connector component that extends along an axis aligned with a midline of a housing of the display unit. As another example, a screen for the first display unit faces a first direction configured for presentation to persons outside of the vehicle, and a screen for the second display unit faces the same first direction. In still another embodiment, a screen for the first display unit faces a first direction configured for presentation to persons outside of the vehicle, and a screen for the second display unit faces a second direction configured for presentation to persons outside of the vehicle, the second direction being opposite to the first direction. In some examples, a first connector component for the first display unit extends outward in a first direction when mounted and a second connector component for the second display unit extends outward in a second direction when mounted, and the second direction is opposite to the first direction.

As another example, the proposed embodiments can include a vehicle incorporating a modular display system. The vehicle includes a first mounting assembly formed on a first portion of an exterior of the vehicle, as well as a second mounting assembly substantially similar to the first mounting assembly formed on a second portion of an exterior of the vehicle. The second mounting assembly and the first mounting assembly are arranged such that the two are substantially symmetrical to each other relative to a midline of the distance between them. The vehicle also includes a first display unit installed in the first mounting assembly in a first orientation, and a second display unit installed in the second mounting assembly in a second orientation that differs from the first orientation by a first rotation increment.

In some embodiments, the first display unit and the second display unit are substantially identical. In one example, the first mounting assembly is adjacent to a forward pillar of the vehicle and the second mounting assembly is adjacent to a rearward pillar of the vehicle. In another example, the first mounting assembly is disposed along a first side of the vehicle and the second mounting assembly is disposed along a second, opposing side of the vehicle.

The following includes definitions of selected terms employed herein. The definitions include various examples and/or forms of components that fall within the scope of a term and that can be used for implementation. The examples are not intended to be limiting. Aspects of the present disclosure can be implemented using hardware, software, or a combination thereof and can be implemented in one or more computer systems or other processing systems. In one example variation, aspects described herein can be directed toward one or more computer systems capable of carrying out the functionality described herein. An example of such a computer system includes one or more processors. A "processor", as used herein, generally processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

The apparatus and methods described herein and illustrated in the accompanying drawings by various blocks, modules, components, circuits, steps, processes, algorithms, etc. (collectively referred to as "elements") can be implemented using electronic hardware, computer software, or any combination thereof. Whether such elements are implemented as hardware or software depends upon the particular application and design constraints imposed on the overall system. By way of example, an element, or any portion of an element, or any combination of elements can be implemented with a "processing system" that includes one or more processors. One or more processors in the processing system can execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described can be implemented in hardware, software, firmware, or any combination thereof. If implemented in software, the functions can be stored on or encoded as one or more instructions or code on a computer-readable medium. Computer-readable media includes computer storage media. Storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The processor can be connected to a communication infrastructure (e.g., a communications bus, cross-over bar, or network). Various software aspects are described in terms of this example computer system. After reading this description, it will become apparent to a person skilled in the relevant art(s) how to implement aspects described herein using other computer systems and/or architectures.

Computer system can include a display interface that forwards graphics, text, and other data from the communication infrastructure (or from a frame buffer) for display on a display unit. Display unit can include display, in one example. Computer system also includes a main memory, e.g., random access memory (RAM), and can also include a secondary memory. The secondary memory can include, e.g., a hard disk drive and/or a removable storage drive, representing a floppy disk drive, a magnetic tape drive, an optical disk drive, etc. The removable storage drive reads from and/or writes to a removable storage unit in a well-known manner. Removable storage unit, represents a floppy disk, magnetic tape, optical disk, etc., which is read by and written to removable storage drive. As will be appreciated, the removable storage unit includes a computer usable storage medium having stored therein computer software and/or data.

Computer system can also include a communications interface. Communications interface allows software and data to be transferred between computer system and external devices. Examples of communications interface can include a modem, a network interface (such as an Ethernet card), a communications port, a Personal Computer Memory Card International Association (PCMCIA) slot and card, etc. Software and data transferred via communications interface are in the form of signals, which can be electronic, electromagnetic, optical or other signals capable of being received by communications interface. These signals are provided to communications interface via a communications path (e.g., channel). This path carries signals and can be implemented using wire or cable, fiber optics, a telephone line, a cellular link, a radio frequency (RF) link and/or other communications channels. The terms "computer program medium" and "computer usable medium" are used to refer generally to media such as a removable storage drive, a hard disk installed in a hard disk drive, and/or signals. These computer program products provide software to the computer system. Aspects described herein can be directed to such computer program products. Communications device can include communications interface.

Computer programs (also referred to as computer control logic) are stored in main memory and/or secondary memory. Computer programs can also be received via communications interface. Such computer programs, when executed, enable the computer system to perform various features in accordance with aspects described herein. In particular, the computer programs, when executed, enable the processor to perform such features. Accordingly, such computer programs represent controllers of the computer system.

In variations where aspects described herein are implemented using software, the software can be stored in a computer program product and loaded into computer system using removable storage drive, hard disk drive, or communications interface. The control logic (software), when executed by the processor, causes the processor to perform the functions in accordance with aspects described herein. In another variation, aspects are implemented primarily in hardware using, e.g., hardware components, such as application specific integrated circuits (ASICs). Implementation of the hardware state machine so as to perform the functions described herein will be apparent to persons skilled in the relevant art(s). In yet another example variation, aspects described herein are implemented using a combination of both hardware and software.

The foregoing disclosure of the preferred embodiments has been presented for purposes of illustration and description. It is not intended to be exhaustive or to limit the embodiments to the precise forms disclosed. Many variations and modifications of the embodiments described herein will be apparent to one of ordinary skill in the art in light of the above disclosure.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

Further, in describing representative embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the present embodiments.

The invention claimed is:

1. A modular display system for a vehicle, the system comprising:
   a first port provided along a first portion of the vehicle and a second port provided along a second portion of the vehicle, the second port including a first pin of a first pin type and second pin of the second pin type;
   a plurality of substantially identical display units including a first display unit and a second display unit, wherein:
      the first display unit is mounted on the first port in a first orientation;
      the second display unit is mounted on the second port in a second orientation that differs from the first orientation by a first rotation increment; and
   a display control module configured to convey image data to the first display unit and the second display unit, where the image data provided to the second display unit is rotated by the first rotation increment when only the second pin is connected to ground, and no rotation of the image data occurs when both the first pin and the second pin are connected to ground.

2. The modular display system of claim 1, wherein the first portion is adjacent to a forward pillar of the vehicle and the second portion is adjacent to a rear pillar of the vehicle.

3. The modular display system of claim 1, wherein the first portion is disposed along a first side of the vehicle and the second portion is disposed along a second, opposing side of the vehicle.

4. The modular display system of claim 3, wherein the first portion is adjacent to a first forward pillar of the vehicle proximate to the first side and the second portion is adjacent to a second forward pillar of the vehicle proximate to the second side.

5. The modular display system of claim 1, the plurality of identical display units further comprising a third display unit and a fourth display unit, wherein:
   the third display unit is mounted on a third portion of the exterior of the vehicle in the first orientation; and
   the second display unit is mounted on a fourth portion of the exterior of the vehicle in the second orientation.

6. The modular display system of claim 5, wherein the display control module is further configured to convey image data to the third display unit and the fourth display unit, where the image data provided to the third display unit is rotated by the first rotation increment.

7. The modular display system of claim 1, wherein each display unit further includes a connector component that extends along an axis aligned with a midline of a housing of the display unit.

8. The modular display system of claim 1, wherein a screen for the first display unit faces a first direction configured for presentation to persons outside of the vehicle, and a screen for the second display unit faces the same first direction.

9. The modular display system of claim 1, wherein a screen for the first display unit faces a first direction configured for presentation to persons outside of the vehicle, and a screen for the second display unit faces a second direction configured for presentation to persons outside of the vehicle, the second direction being opposite to the first direction.

10. The modular display system of claim 1, wherein a first connector component for the first display unit extends outward in a first direction when mounted and a second connector component for the second display unit extends outward in a second direction when mounted, and the second direction is opposite to the first direction.

11. A method of displaying image data on an exterior of a vehicle, the method comprising:
   transmitting first image data to a first display mounted at a first orientation on a first portion of the exterior of the vehicle;
   presenting a first image on a screen for the first display based on the first image data;
   transmitting the first image data to a second display mounted at a second orientation on a second portion of the exterior of the vehicle, the second orientation being rotated by a first increment relative to the first orientation;
   automatically rotating the first image data by the first increment before presenting a second image on a screen for the second display, the second image based on the rotated first image data; and
   wherein the first image data is automatically rotated in response to detection of a first connection pattern for the second display that is different than a second connection pattern for the first display unit, and the first connection pattern includes one or more ground connections and the second connection pattern has no ground connections.

12. The method of claim 11, wherein the first increment is approximately 180 degrees.

13. The method of claim 11, wherein the first increment is approximately 90 degrees.

14. The method of claim 11, further comprising:
   transmitting the first image data to a third display mounted at a third orientation on a third portion of the exterior of the vehicle, the third orientation being rotated by a second increment relative to the first orientation that is different than the first increment;

automatically rotating the first image data by the second increment before presenting the first image data as a third image on a screen for the third display; and wherein the first image data is automatically rotated by the second increment in response to detection of a third connection pattern for the third display that is different from either of the first connection pattern and the second connection pattern.

15. The method of claim 14, wherein the first connection pattern includes two ground connections, and the third connection pattern includes only one ground connection.

16. The method of claim 14, wherein the first connection pattern includes a first pin of a first type connected to ground and a second pin of a second type connected to ground, and the second connection pattern includes a third pin of the first type disconnected to ground and a fourth pin of the second type disconnected from ground.

17. A vehicle incorporating a modular display system, the vehicle comprising:

a first control port comprising a first set of pins including a first pin of a first pin type and a second pin of a second pin type that differs from the first pin type formed on a first portion of an exterior of the vehicle;

a first display unit connected to the first control port; and a display control module configured to automatically reorient image data for presentation on the first display unit only when either:

there is no connection to ground by either the first pin or the second pin, or only the first pin of the first set of pins is connected to ground, and wherein the display control module is otherwise configured to maintain an original orientation of the image data.

18. The vehicle of claim 17, further comprising a second display unit and only the first display unit is directly connected to an electronic control unit (ECU) of the vehicle.

19. The vehicle of claim 18, wherein the vehicle includes a second control port connected to the second display unit, and the display control module is configured to recognize connections associated with each of the pin types in both the first control port and the second control port and reorient the image data in response to their respective connection patterns.

20. The vehicle of claim 18, wherein the first display unit and the second display unit are substantially identical and interchangeable.

\* \* \* \* \*